No. 769,439. PATENTED SEPT. 6, 1904.
W. HECKART.
DERRICK.
APPLICATION FILED JAN. 14, 1904.
NO MODEL. 5 SHEETS—SHEET 1.
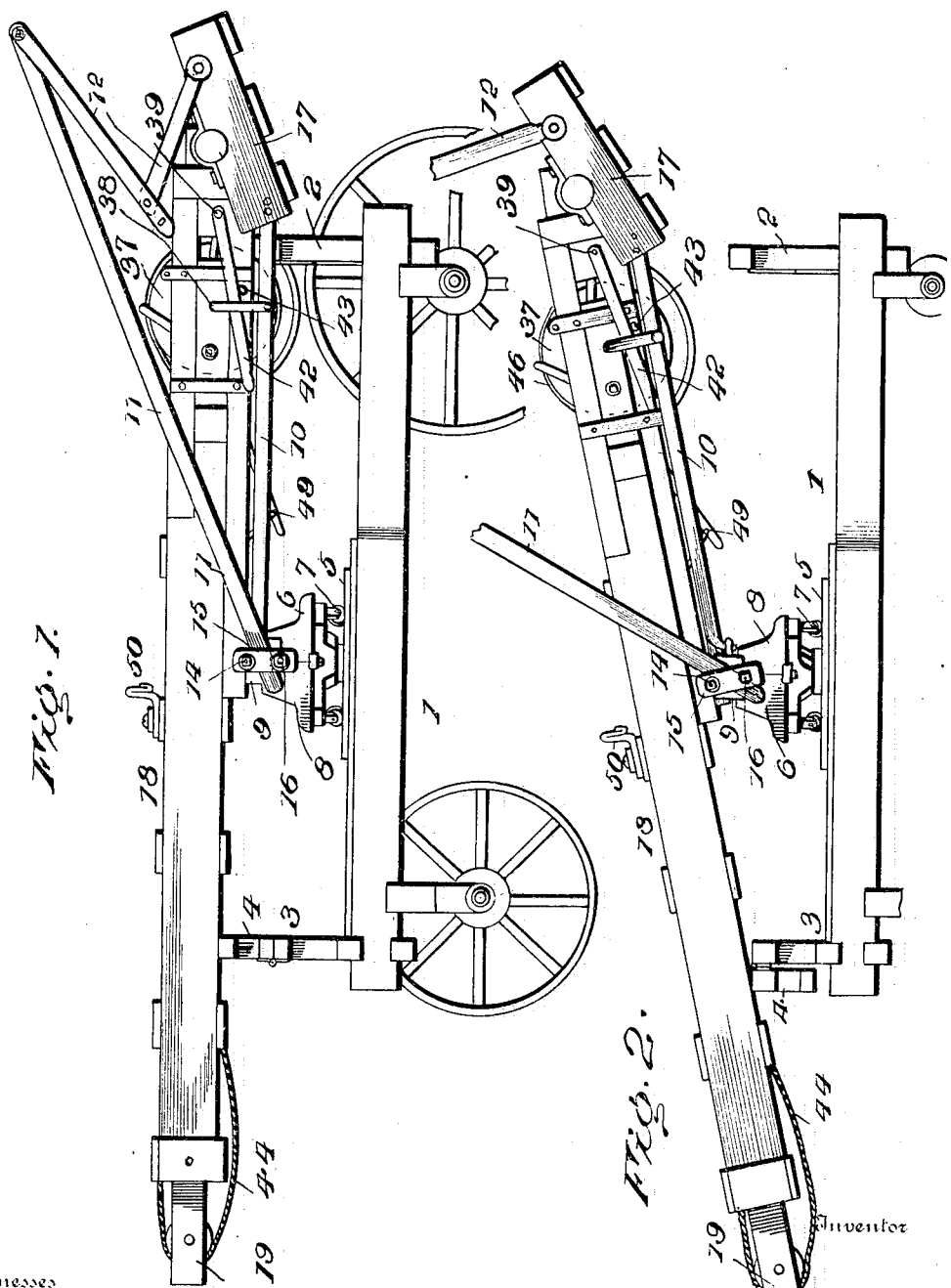

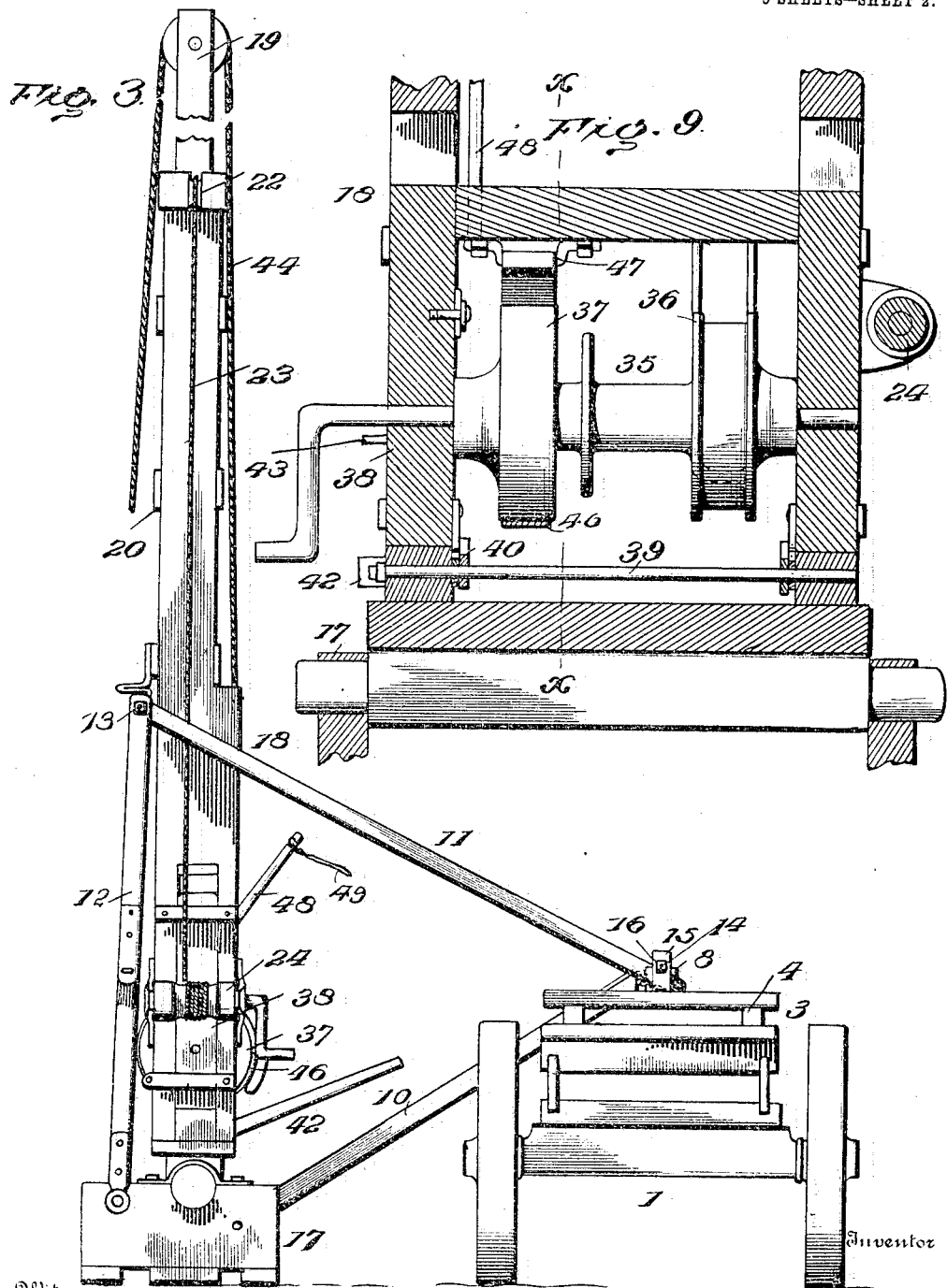

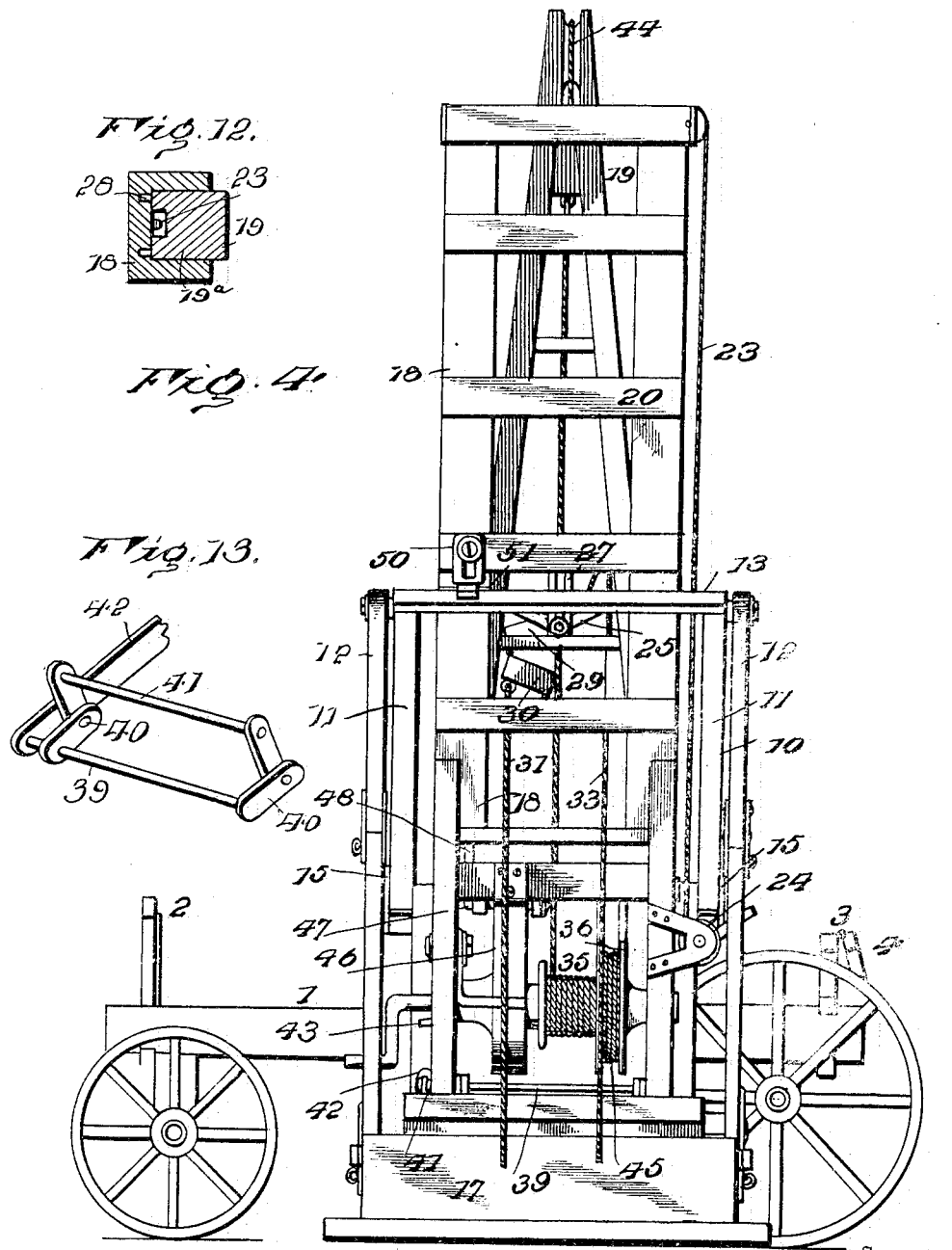

No. 769,439. PATENTED SEPT. 6, 1904.
W. HECKART.
DERRICK.
APPLICATION FILED JAN. 14, 1904.
NO MODEL. 5 SHEETS—SHEET 4.
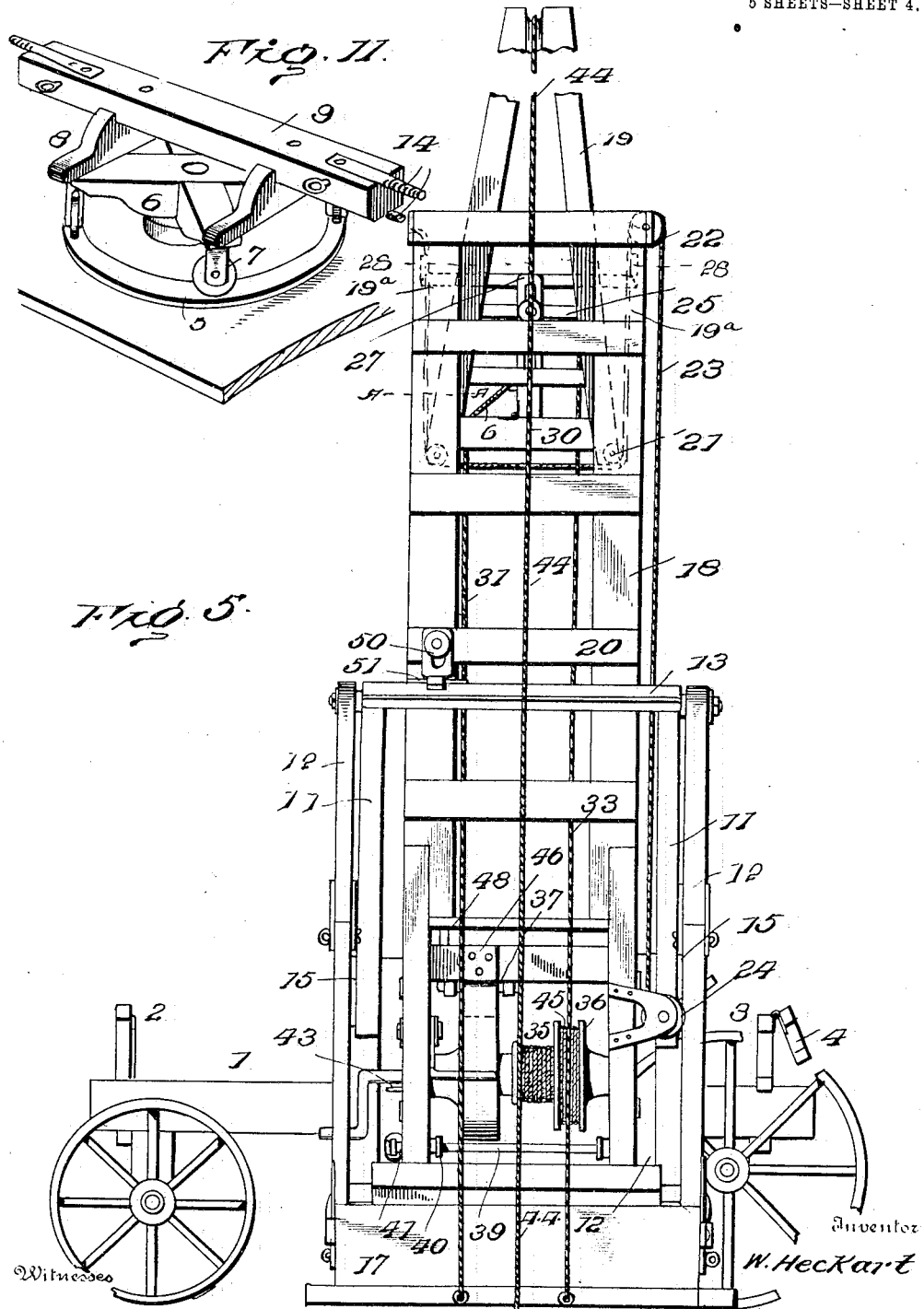

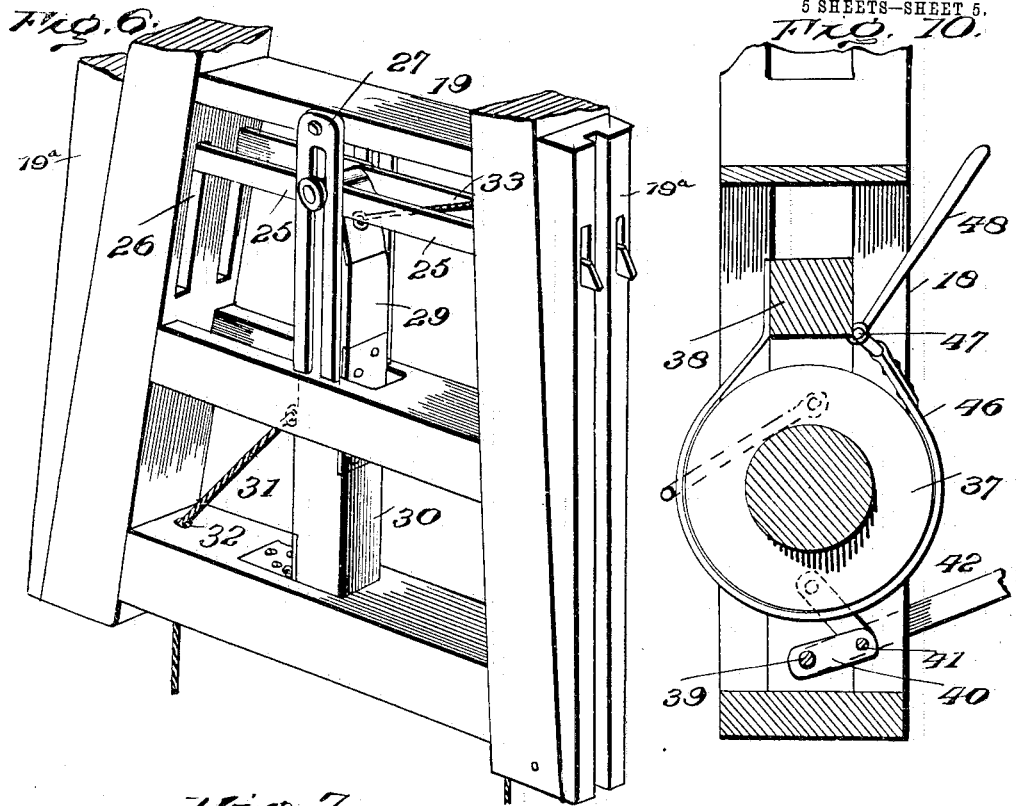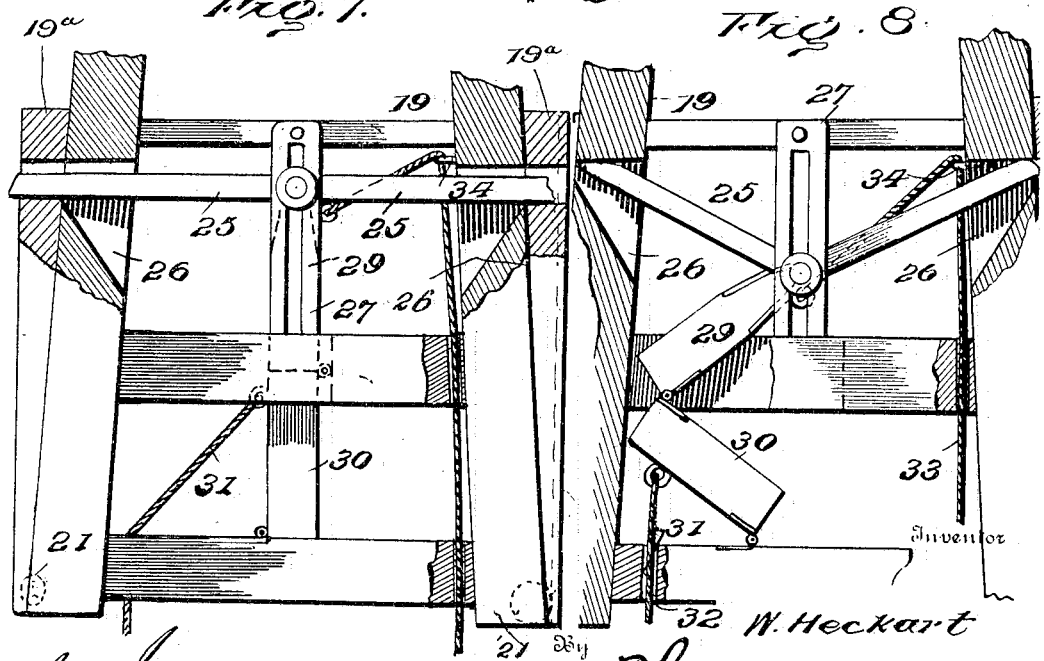

No. 769,439.

Patented September 6, 1904.

UNITED STATES PATENT OFFICE.

WILLIAM HECKART, OF BRADNER, OHIO.

DERRICK.

SPECIFICATION forming part of Letters Patent No. 769,439, dated September 6, 1904.

Application filed January 14, 1904. Serial No. 189,030. (No model.)

*To all whom it may concern:*

Be it known that I, WILLIAM HECKART, a citizen of the United States, residing at Bradner, in the county of Wood and State of Ohio, have invented certain new and useful Improvements in Derricks, of which the following is a specification.

The primal object of this invention is to facilitate the handling of derricks especially constructed for use in connection with Artesian and oil wells and which are of great length, weight, and bulk by reason of the peculiar nature of the work for which they are intended.

In accordance with this invention the derrick is mounted upon a truck constituting a carrier and is connected therewith by means of a turn-table and brace-frame structure, whereby said truck or carrier may be utilized as an anchoring means for the derrick when erected for the performance of the accustomed work.

The invention also contemplates an extensible derrick, the parts or sections being telescopically related to admit of lengthening and shortening the derrick, as may be required. A peculiar lock mechanism coöperates with the movable derrick-section for securance thereof in the located position, said lock mechanism being operable from the ground by means of pull ropes or cords, so as to be thrown into or out of action either to secure or to release the section, as may be required.

A further purpose of the invention is to mount the bull-wheel and windlass so as to be adjustable with reference to the derrick, whereby the cable may be tightened to admit of loosening the tools upon the well side, said parts being mounted in a frame which is slidable with reference to the derrick and under control of the operator to admit of adjustment at will to effect the desired result.

A still further purpose of the invention is to improve and simplify the general construction of the apparatus, whereby the same may be conveniently and expeditiously erected and folded and otherwise manipulated to meet varying conditions.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side elevation of a derrick embodying the invention, showing the parts folded. Fig. 2 is a view similar to Fig. 1, showing the brace-frame set up, the pivoted end support for the derrick turned down, and the derrick tilted to disengage the opposite end from the fixed support prior to swinging the derrick into position. Fig. 3 is a side view showing the derrick set up and prior to extension thereof. Fig. 4 is a front view of the derrick. Fig. 5 is a view similar to Fig. 4, showing the derrick extended and locked. Fig. 6 is a detail perspective view of the lock mechanism for holding the extensible derrick-section in the located position. Fig. 7 is a front view of said lock mechanism as it appears when holding the movable derrick-section extended. Fig. 8 is a view of the parts shown in Fig. 7, illustrating the position of the elements when the movable derrick-section is released. Fig. 9 is a sectional view of the lower portion of the derrick, illustrating the movable frame carrying the windlass and the adjunctive parts on a larger scale. Fig. 10 is a section on the line X X of Fig. 9 looking in the direction of the arrow. Fig. 11 is a detail perspective view of the turn-table bolster, to which the bars of the brace-frame are attached. Fig. 12 is a detail section of a side portion of the derrick about on the line A A of Fig. 5. Fig. 13 is a detail perspective view of the instrumentalities for moving the adjustable frame carrying the windlass, bull-wheel, and brake mechanism.

Corresponding and like parts are referred to in the following description and indicated in all the views of the drawings by the same reference characters.

The truck or carrier is indicated at 1 and may be of any substantial construction so long as it subserves the purpose of providing a rigid and durable support for the derrick and adjunctive parts. Standards are provided at each end of the truck or carrier to receive the derrick, as indicated most clearly in Fig. 1. The standard 2 is rigid, whereas the standard 3 is composed of articulated parts, the upper portion 4 being hinged so as to be turned down out of the way, as indicated in Fig. 2, to admit of lowering the corresponding end of the derrick so as to elevate and disconnect the opposite end of the derrick from the standard 2 preliminary to swinging the derrick to one side or the other of the truck, as may be required.

The turn-table forming the pivotal connection between the brace-frame of the derrick and the truck may be of any design or construction and comprises a track 5 and base 6, the latter comprising pulleys or rolling supports 7 to travel upon the track 5, and head-blocks 8, to which are secured the bolster 9, which forms a support for the derrick intermediate of the standards 2 and 3, to which the bars of the brace-frame are connected.

The brace-frame comprises two sets of bars 10 and 11, which are diverged at their outer ends and are held separated by the stay-bars 12. A transverse bar 13 connects the outer ends of the bars 11 and constitutes a tie therefor and a stop to limit the forward movement of the derrick when erected. The bars 10 may be connected in any manner to the bolster 9, an eye being provided to admit of ready detachment of said bars from the bolster when desired for any purpose. The bars 11 are preferably adjustably connected to the bolster, and for this purpose threaded rods 14 project from the extremities of the bolster and receive the yoke or gland 15 and clamp-nuts 16, the end portions of the bars 11 being clamped between the extremities of the bolster and the respective yokes or glands 15. The stay-bars 12 are preferably composed of hinged or pivoted parts to admit of the bars 10 and 11 folding into approximately a common plane when it is required to reduce the apparatus to a compact form for transportation or storage, as indicated most clearly in Fig. 1. The platform or base of the derrick is indicated at 17, and corresponding ends of the bars 10 and 12 are connected thereto, thereby fixing the position of the platform and bracing the same from the truck when the derrick is set up.

The derrick is pivotally mounted upon the platform or base 17 to admit of its erection or folding. The derrick comprises the lower section 18 and the upper or movable section 19, the latter being slidable and directed in its movements by suitable means. The risers or side pieces of the lower section 18 are hollow and are of approximately U form in cross-section and are placed with the open sides facing inward or toward each other, so as to receive the upper or movable section 19 and form guides therefor. Cross-pieces 20 connect the risers or side pieces and materially assist in bracing and strenghtening the structure. The upper or movable section 19 preferably has its side pieces upwardly converged and rigidly connected by transverse pieces, so as to form a substantial structure. Tapering pieces 19$^a$ are attached to the lower end portions of the side pieces of the section 19 to fill the angular spaces between said side pieces and the parallel side members of the section 18 to prevent any appreciable lateral play of the section 19 and insure steadiness of movement and stability of structure. Pulleys 21 are provided at the lower ends of the side pieces of the section 19, and a pulley 22 is located at the upper end of a riser or side piece of the section 18. The rope or cable 23 for extending the derrick is connected at one end to the upper extremity of the riser or side piece of the lower section opposite to that carrying the pulley 22 and passes downward, thence around the pulleys 21, thence upward and over the pulley 22, thence downward to the windlass 24 to which the opposite end is connected and upon which said end portion is adapted to wind to effect an upward movement of the section 19 when it is required to lengthen the derrick. The windlass 24 is journaled in brackets attached to a riser of the lower section 18 and is adapted to be operated by hand or other power and is prevented from backward rotation by the usual ratchet mechanism coöperating therewith.

The lock mechanism for securing the section 19 in the desired adjusted position comprises oppositely-disposed lock-bars 25, which are pivotally connected at their inner ends and have their outer ends extended into openings 26 in the risers or side pieces of the section 19. For greater security two sets of lock-bars 25 are provided, making four lock-bars in all. To insure proper working of the lock-bars, guides 27 are disposed parallel with the side pieces or risers, so as to occupy a central position, and these guides consist of slotted plates which are attached at their ends to cross-pieces joining the side pieces of the section 19. The outer ends of the lock-bars 25 are adapted to enter openings 28 in the side pieces of the section 18, said openings being provided at different elevations or points in the length of the risers, so that the section 19 may be held at any determinate position. The lock-operating means comprise toggles 29 and 30, the upper toggle 29 being pivotally connected to the inner ends of the lock-bars 25 and the lower toggle 30 being pivotally connected to a cross-piece of the derrick-section 19. When the derrick is erected and the lock-bars 25 projected into engagement with the derrick-section 18, the toggles 29 and 30 occupy a vertical position, the lowermost toggle resting squarely upon the cross-piece to which it is pivoted and the ends of the toggles 29 and 30 squarely abutting, whereby the two toggles constitute a rigid brace or support to prevent downward movement of the lock-bars at their inner or pivotal ends. The toggles 29 and 30 are sufficiently heavy to admit of their automatic operation to effect release of the lock-bars when the joint between them is broken. A rope or cord 31 for effecting a release of the lock-bars by breaking the joint between the toggles 29 and 30 is connected to the lower toggle 30 adjacent to the joint and passes laterally and downwardly through a guide-opening 32 in the cross-piece to which the toggle 30 is pivoted and extends within convenient reach of the ground, so as to be drawn upon to effect a release of the derrick-section 19 when it is required to move the same either upward or downward. The rope or cable 33 for setting the lock-bars is connected at one end to the upper end of the toggle 29 and passes laterally, thence downwardly, through a guide-eye 34 at one side of the section 19 and extends within convenient reach of the ground, so as to be operated to throw the lock into action to secure the movable section 19 when properly locked. The windlass 35, provided with the bull-wheel 36 and brake-wheel 37, is journaled in a frame 38, slidably mounted with reference to the derrick to admit of vertical movement of the windlass, whereby the operating rope or cable may be tightened on the well side to admit of loosening the tools. The frame 38 comprises side pieces and an upper cross-piece and is mounted in openings in the risers of the derrick-section 18, so as to be directed in its movements. A shaft 39 is journaled to the side pieces of the section 18 and is connected by toggle-links 40 with the side pieces of the frame 38, the toggle-links being pivotally connected by the tie-rod 41, which extends from one side of the derrick to the other. The lower ends of the toggle-links are rigidly connected to the shaft 39, so as to turn therewith, thereby admitting of the toggle-links being straightened or the joint between them broken, as may be required. A lever 42 is fitted to the shaft 39 and serves as a means for turning the same when it is required to move the frame 38 either to draw the windlass downward or to move it upward. The lever 42 is held in normal position by a pin 43, which acts in the capacity of a fastener. When the lever 42 is released and its upper end thrown downward, the frame 38 is drawn downward, carrying with it the windlass 35, whereby the operating rope or cable is tightened upon the well side and provision had for releasing the tools.

The operating rope or cable 44 passes over a sheave at the upper end of the derrick in the usual manner and one end is connected to the windlass 35 and is adapted to wind thereon, the opposite end being attached to the work in any determinate way. The bull-wheel 36 may be of any construction and secured to the windlass 35 in any approved way and the rope or cable 45 connected to and wound thereon and adapted to be connected with any operating mechanism in the usual way. The brake-wheel 37 is connected either to the windlass or the shaft thereof and coöperates with the brake strap or band 46, which has one end connected to the cross-piece of the frame 38 and its opposite end attached to the crank portion of the crank-shaft 47, mounted in bearings applied to the cross-piece of the frame 38 and having an end portion extended to form a lever or operating-handle 48, to which the rope or cord 49 is attached and extended within convenient reach of the operator, whereby the brake may be controlled as desired.

For storage or transportation the derrick and brace-frame are folded upon the truck or carrier 1 about as indicated in Fig. 1, and when required for use the derrick is moved to the required point by means of the truck, after which the hinged section 4 of the standard 3 is thrown downward and the derrick tilted upon the bolster 9, so as to disengage its opposite end from the standard 2, when the derrick may be turned from either side of the truck to the required position. The brace-frame may be set up either preliminary to swinging the derrick to position or after the same has been positioned. The brace-frame is extended by moving the outer end of the bars 11 away from the base 17. This movement straightens the joint between the sections of the stay-bars 12. Fig. 2 shows the relative position of the brace-frame, the derrick, and the truck when the brace-frame is extended and the derrick tilted upon the bolster prior to being swung to one side or the other of the truck. The derrick and brace-frame swing laterally together about the vertical axis. After the derrick has been turned to the required position it is lowered to bring the base 17 upon the ground, the derrick and brace turning upon the bolster 9. The nuts 16, previously loosened, are now tightened to fix the position of the bars 11 and the parts of the brace-frame. The operating rope or cable 44 is connected to the well or other point, and by operating the windlass 35, either by hand or other convenient way, the derrick is elevated, and when moved against the transverse bar 13 of the brace-frame a stop or catch 50, secured to the derrick, engages with the transverse bar 13 or a corresponding stop or catch 51 applied thereto, thereby holding the derrick in working position. By proper manipulation of the windlass 24 the rope or cable 23 is wound thereon and the upper section 19 of the derrick adjusted to the required point, which when reached the section 19 is made secure by pulling upon the lock-setting rope or cable 33. The inclination of the derrick may be regulated by adjusting the brace-bar 11 with reference to the bolster 9. The derrick when erected is adapted for use in the well-known manner. To lower the derrick, the section 19, if extended, is first lowered by pulling upon the lock-releasing rope or cord 31 and manipulating the windlass 24. The catch device between the derrick and the brace-frame is released and by proper manipulation of the rope or cord 49 and the rope or cable 45 the windlass 35 may be controlled so as to release the rope or cable 44 and permit the gradual folding of the derrick upon the bolster 9, after which the derrick may be swung back into position upon the truck or carrier and the parts rearranged to assume the position about as shown in Fig. 1.

Having thus described the invention, what is claimed as new is—

1. In combination, a truck or carrier, a derrick adapted to be supported thereby, and positive connecting means between said derrick and the truck or carrier and serving to brace the derrick when erected at one side or the other of the said truck, whereby the latter serves as anchoring means to hold the derrick in place, substantially as set forth.

2. In combination, a truck or carrier, a derrick adapted to be supported thereby, a brace-frame having connection with the derrick, and means pivotally connecting the brace-frame with the truck or carrier to admit of erecting the derrick on one side of the truck or carrier and utilizing the latter as anchoring means therefor, substantially as specified.

3. In combination, a truck or carrier, a derrick, a turn-table mounted upon the truck or carrier, and positive connecting means between said turn-table and derrick to admit of the truck constituting anchoring means for holding the derrick in place, substantially as described.

4. In combination, a truck or carrier, a derrick adapted to be supported thereby, a turn-table applied to the truck or carrier, connections between the derrick and turn-table to admit of utilizing the truck as anchoring means for the derrick, and means for adjustably connecting certain of the connections with said turn-table to admit of varying the inclination of the derrick when erected, substantially as set forth.

5. In combination, a truck or carrier, a derrick adapted to be supported thereby, a turn-table applied to the truck, a brace-frame connected to the turn-table and comprising brace-bars adjusted to be outwardly diverged, pivoted stay-bars for fixing the angle formed between the diverged brace-bars, means pivotally connecting the derrick with the brace-frame, and other means for connecting the derrick when erected with the upper portion of the brace-frame, substantially as specified.

6. In combination, a truck or carrier, a turn-table mounted thereon and having a bolster, a brace-frame connected with said bolster, a derrick pivotally connected with the brace-frame and adapted to rest upon said bolster when folded and to be supported by the brace-frame when erected, and connecting means between the derrick and brace-frame for holding the derrick when erected, substantially as described.

7. In combination, a truck or carrier having standards at opposite ends, a turn-table intermediate of the standards, a derrick supported in folded position upon the truck by means of the turn-table and end standards, and connecting means between the turn-table and derrick, whereby the latter when erected is held in place by the truck which constitutes anchoring means therefor, substantially as specified.

8. In combination, a truck or carrier, standards at the ends thereof, one of said standards comprising a hinged section, a turn-table applied to the truck, a derrick adapted to be supported by the end standards and turn-table and to tilt upon the latter when the hinged section of the standard is thrown downward, and positive connecting means between the derrick and turn-table, substantially as described.

9. In combination, a truck or carrier, a platform, a derrick pivotally connected to said platform, a turn-table mounted upon the truck, a brace-frame connecting said platform with the turn-table, and means for connecting the derrick when erected to the brace-frame, substantially as specified.

10. In combination, a derrick, a windlass for the operating rope or cable, and mountings for said windlass movable with reference to the derrick to admit of movement of the windlass in the plane of the derrick, substantially as and for the purpose specified.

11. In combination, a derrick, a windlass for the operating rope or cable, toggle-links connecting the mountings of the windlass of the derrick, and means for actuating the toggle-links to effect movement of the windlass in the plane of the derrick, substantially as described.

12. In combination, a derrick, a frame slidable with reference to the derrick, a windlass journaled to said frame, and means for sliding the frame and moving the windlass in the plane of the derrick, substantially as set forth.

13. In combination, a derrick, a windlass for the operating rope or cable, a shaft, toggle-links connecting the shaft with the bearings of the windlass, and means for turning said shaft in its bearings to effect operation of the toggle-links, whereby the windlass is moved in the plane of the derrick, substantially as and for the purpose set forth.

14. In combination, a derrick, a frame slidable with reference to the derrick, a windlass journaled to said frame, a bull-wheel and brake mechanism concentric and connected with said windlass and supported by the frame, and actuating means for operating the frame to move the windlass in the plane of the derrick to effect tightening of the operating rope or cable, substantially as set forth.

15. In combination with a derrick comprising extensible parts, a lock mechanism carried by the movable section for securing it in the located position, a rope or cord for setting the lock mechanism, and another rope or cord for releasing the lock mechanism, substantially as described.

16. In a derrick comprising movable sections, a lock mechanism comprising oppositely-disposed lock-bars, toggles for effecting a setting and a release of the lock-bars and holding the same when set, and means coöperating with the toggles to effect a setting or a release of the lock-bars, as may be required, substantially as set forth.

17. In a derrick comprising extensible sections, means for securing the sections in the located position, the same comprising oppositely-disposed lock-bars pivotally connected, toggles pivotally connected to the lock-bars, a guide for directing the pivotal connection between the lock-bars and toggles, and means for alining and breaking the joint between the toggles, substantially as set forth.

18. In a derrick comprising slidable sections, lock means therefor comprising oppositely-disposed lock-bars pivotally connected, a guide centrally disposed between the risers of the derrick and parallel therewith and receiving the pivotal connection of the lock-bars, toggles connected to the pivotal connection of the lock-bars, and operating means for setting or releasing the lock mechanism, substantially as specified.

19. In combination, a lower derrick, a movable section, means for operating the movable section to effect extension thereof, oppositely-disposed lock-bars having their outer ends loosely entered in openings formed in the risers of the movable section and having their inner ends pivotally connected, a guide for receiving the pivotal connections between the lock-bars, toggles for effecting and setting a release and bracing the lock-bars, a pull-rope connected with the toggles and extended within convenient reach to effect a setting of the lock mechanism, and another cord connected with the toggles to effect a release of the lock mechanism, substantially as set forth.

In testimony whereof I affix my signature in presence of two witnesses.

WILLIAM HECKART. [L. S.]

Witnesses:
J. W. WYANT,
A. W. REES.